US009191075B2

(12) United States Patent
Jung et al.

(10) Patent No.: US 9,191,075 B2
(45) Date of Patent: Nov. 17, 2015

(54) WIRELESS POWER CONTROL METHOD, SYSTEM, AND APPARATUS UTILIZING A WAKEUP SIGNAL TO PREVENT STANDBY POWER CONSUMPTION

(71) Applicant: Hanrim Postech Co., Ltd., Suwon-si, Gyeongi-do (KR)

(72) Inventors: Chun-Kil Jung, Seoul (KR); Hee-Jeong Park, Gunpo-si (KR); Byong-Uk Hwang, Incheon (KR)

(73) Assignee: HANRIM POSTECH CO., LTD., Suwon-Si (KR)

( * ) Notice: Subject to any disclaimer, the term of this patent is extended or adjusted under 35 U.S.C. 154(b) by 280 days.

(21) Appl. No.: 13/745,336

(22) Filed: Jan. 18, 2013

(65) Prior Publication Data

US 2014/0184149 A1 Jul. 3, 2014

(30) Foreign Application Priority Data

Dec. 31, 2012 (KR) .................... 10-2012-0158114

(51) Int. Cl.
*H02J 7/00* (2006.01)
*H04B 5/00* (2006.01)
*H02J 7/02* (2006.01)

(52) U.S. Cl.
CPC ............ *H04B 5/0037* (2013.01); *H04B 5/0093* (2013.01); *H02J 7/025* (2013.01); *H02J 2007/0049* (2013.01)

(58) Field of Classification Search
CPC ..................... H02J 7/025; H02J 2007/0049
USPC .................................................. 320/107–108
See application file for complete search history.

(56) References Cited

U.S. PATENT DOCUMENTS

| | | | |
|---|---|---|---|
| 8,842,635 B2 * | 9/2014 | Kim et al. ............. | 370/331 |
| 2006/0145659 A1 * | 7/2006 | Patino et al. ............ | 320/108 |
| 2011/0119135 A1 * | 5/2011 | Grilli et al. ............. | 705/14.64 |
| 2011/0127951 A1 * | 6/2011 | Walley et al. ............ | 320/108 |
| 2011/0127953 A1 * | 6/2011 | Walley et al. ............ | 320/108 |
| 2011/0156639 A1 * | 6/2011 | Ryu et al. ............... | 320/108 |
| 2011/0156640 A1 * | 6/2011 | Moshfeghi ............... | 320/108 |
| 2011/0181240 A1 * | 7/2011 | Baarman et al. .......... | 320/108 |
| 2011/0248570 A1 * | 10/2011 | Hong et al. ............. | 307/104 |
| 2012/0049642 A1 * | 3/2012 | Kim et al. ............... | 307/104 |
| 2012/0091949 A1 * | 4/2012 | Campanella et al. ...... | 320/108 |
| 2012/0153731 A9 * | 6/2012 | Kirby et al. ............ | 307/104 |
| 2012/0155136 A1 * | 6/2012 | Von Novak et al. ....... | 363/126 |
| 2012/0161539 A1 * | 6/2012 | Kim et al. ............... | 307/104 |
| 2012/0194206 A1 * | 8/2012 | Nagasaka et al. ........ | 324/750.01 |
| 2012/0202435 A1 * | 8/2012 | Kim et al. ............... | 455/69 |
| 2012/0223589 A1 * | 9/2012 | Low et al. ............... | 307/104 |
| 2012/0235506 A1 * | 9/2012 | Kallal et al. ............ | 307/104 |
| 2012/0235636 A1 * | 9/2012 | Partovi .................. | 320/108 |
| 2012/0242283 A1 * | 9/2012 | Kim et al. ............... | 320/108 |
| 2012/0248891 A1 * | 10/2012 | Drennen ................. | 307/104 |
| 2012/0280575 A1 * | 11/2012 | Kim et al. ............... | 307/104 |

(Continued)

*Primary Examiner* — Stacy Whitmore
(74) *Attorney, Agent, or Firm* — Stein IP, LLC

(57) ABSTRACT

Disclosed herein are a wireless power transmission control method in a wireless power transmission system, including receiving awake-up signal from a wireless power receiving apparatus and transmitting a wireless power transmission signal to the wireless power receiving apparatus through a transmission coil of a wireless power transmission apparatus while activating a deactivated power block when the wake-up signal is received; a wireless power transmission apparatus using the same; and a wireless power receiving apparatus using the same.

20 Claims, 3 Drawing Sheets

(56) References Cited

U.S. PATENT DOCUMENTS

| | | | |
|---|---|---|---|
| 2012/0281547 A1* | 11/2012 | Kim et al. | 370/242 |
| 2012/0286726 A1* | 11/2012 | Kim et al. | 320/108 |
| 2012/0293009 A1* | 11/2012 | Kim et al. | 307/104 |
| 2012/0293118 A1* | 11/2012 | Kim et al. | 320/108 |
| 2012/0306284 A1* | 12/2012 | Lee et al. | 307/104 |
| 2012/0306433 A1* | 12/2012 | Kim et al. | 320/106 |
| 2013/0049674 A1* | 2/2013 | Davis | 320/101 |
| 2013/0057078 A1* | 3/2013 | Lee et al. | 307/104 |
| 2013/0099734 A1* | 4/2013 | Lee et al. | 320/108 |
| 2013/0134796 A1* | 5/2013 | Kanno | 307/104 |
| 2013/0134927 A1* | 5/2013 | Park et al. | 320/107 |
| 2013/0154552 A1* | 6/2013 | Siessegger | 320/108 |
| 2013/0154560 A1* | 6/2013 | Walley et al. | 320/108 |
| 2013/0234532 A1* | 9/2013 | Fells et al. | 307/104 |
| 2013/0257365 A1* | 10/2013 | Redding | 320/108 |
| 2013/0278206 A1* | 10/2013 | Won et al. | 320/108 |
| 2013/0300204 A1* | 11/2013 | Partovi | 307/104 |
| 2013/0300358 A1* | 11/2013 | Kirby et al. | 320/108 |
| 2013/0342025 A1* | 12/2013 | Cook et al. | 307/104 |
| 2014/0015478 A1* | 1/2014 | Von Novak | 320/108 |
| 2014/0021798 A1* | 1/2014 | Kesler et al. | 307/104 |
| 2014/0035524 A1* | 2/2014 | Zeine | 320/108 |
| 2014/0049422 A1* | 2/2014 | Von Novak et al. | 342/146 |
| 2014/0111154 A1* | 4/2014 | Roy et al. | 320/108 |
| 2014/0111156 A1* | 4/2014 | Lee et al. | 320/108 |
| 2014/0117921 A1* | 5/2014 | Suomela | 320/103 |
| 2014/0125275 A1* | 5/2014 | Low et al. | 320/108 |
| 2014/0145675 A1* | 5/2014 | Shimizu | 320/108 |
| 2014/0159653 A1* | 6/2014 | Von Novak et al. | 320/108 |
| 2014/0184148 A1* | 7/2014 | Van Der Lee et al. | 320/108 |
| 2014/0184149 A1* | 7/2014 | Jung et al. | 320/108 |
| 2014/0191719 A1* | 7/2014 | Nagatsuka et al. | 320/108 |
| 2014/0203758 A1* | 7/2014 | Moshfeghi | 320/103 |
| 2014/0225560 A1* | 8/2014 | Walley et al. | 320/108 |
| 2014/0261741 A1* | 9/2014 | Konishi | 137/15.09 |
| 2014/0285140 A1* | 9/2014 | Jung | 320/108 |
| 2014/0340036 A1* | 11/2014 | Toncich et al. | 320/108 |
| 2014/0347233 A1* | 11/2014 | Mahanfar et al. | 343/720 |
| 2014/0354071 A1* | 12/2014 | Hamam et al. | 307/104 |
| 2014/0368164 A1* | 12/2014 | Jung | 320/108 |

* cited by examiner

WIRELESS POWER CONTROL METHOD, SYSTEM, AND APPARATUS UTILIZING A WAKEUP SIGNAL TO PREVENT STANDBY POWER CONSUMPTION

CROSS-REFERENCE TO RELATED APPLICATIONS

This application claims the benefit of Korean Application No. 10-2012-0158114, filed Dec. 31, 2012, in the Korean Intellectual Property Office, the disclosure of which is incorporated in its entirety herein by reference.

BACKGROUND OF THE INVENTION

1. Field of the Invention

The present invention relates to a wireless power transmission control method in a wireless power transmission system, a wireless power transmission apparatus using the same, and a wireless power receiving apparatus using the same.

2. Description of the Related Art

Generally, a battery pack is charged with electrical energy supplied from an external charger and supplies the charged energy to power the operation of portable terminals (mobile phones, PDAs, and the like). The battery pack generally comprises a battery cell which can be charged with electrical energy, a circuit for charging and discharging the battery cell (the discharging being to supply its electrical energy to a portable terminal, and the like.

To electrically connect a charger and a battery pack and thus allow charging of the battery pack, one known method is a terminal supply method, wherein a terminal of the charger through which the power is outputted is directly connected to a terminal of the battery pack to which the power is inputted through a cable, a connector, or the like.

However, when the terminal supply method supplies electrical energy, since the terminal of the battery pack and the terminal of the charger have different potential differences, the terminal supply method may cause an instantaneous discharging phenomenon when the charger and the battery pack contact or separate from each other. When foreign materials have accumulated in one or both terminals, the instantaneous discharge phenomenon may heat said materials, triggering a fire or the like.

Further, the electrical energy charged in the battery pack may be naturally discharged into the environment through the terminal of the battery pack, due to humidity or the like, which may lead to a degradation in lifespan and performance of the battery pack.

Recently, in order to solve the above problems, a contactless charging system using a wireless power transmission method and control methods has been proposed.

SUMMARY OF THE INVENTION

While not limited thereto, according to an embodiment of the present invention, a wireless power transmission control method in a wireless power transmission system comprises: receiving awake-up signal from a wireless power receiving apparatus; and, when the wake-up signal is received, transmitting a wireless power transmission signal to the wireless power receiving apparatus through a transmission coil of a wireless power transmission apparatus while activating a deactivated power block.

According to an aspect of the invention, the wake-up signal may be received through a near field communication module.

According to an aspect of the invention, the transmitting of the wireless power transmission signal to the wireless power receiving apparatus through the transmission coil of the wireless power transmission apparatus while activating the deactivated power block may be in response to an ID signal of the wireless power receiving apparatus received through the near field communication module.

According to an aspect of the invention, the wireless power transmission control method may further comprise: determining whether an external object is sensed using an object sensing unit of the wireless power transmission apparatus; and, when the external object is sensed and the wake-up signal is not received, operating an alarm module of the wireless power transmission apparatus.

According to an aspect of the invention, the wireless power transmission control method may further comprise: when the wake-up signal is not received and a start signal of a user input unit of the wireless power transmission apparatus is inputted, transmitting the wireless power signal through the transmission coil of the wireless power transmission apparatus.

According to an aspect of the invention, the transmitting of the wireless power transmission signal to the wireless power receiving apparatus through the transmission coil of the wireless power transmission apparatus while activating the power blocks inactivated, when the wake-up signal is received may comprise: receiving a power transmission request signal from the wireless power receiving apparatus; and, when the power transmission request signal is received, transmitting a wireless power signal having the same frequency as a resonance frequency of an impedance matching unit of the wireless power receiving apparatus through the transmission coil.

According to an aspect of the invention, the power transmission request signal may be received through a near field communication module.

While not limited thereto, according to another embodiment of the present invention, a wireless power transmission apparatus comprises: a transmission coil configured to transmit a wireless power signal to a wireless power receiving apparatus; a communication unit configured to receive a wake-up signal from the wireless power receiving apparatus; a power block configured to supply power; and a transmission control unit configured to transmit the wireless power transmission signal to the wireless power receiving apparatus through the transmission coil while activating the deactivated power block, when the wake-up signal is received through the communication unit.

According to an aspect of the invention, the communication unit may comprise a near field communication module.

According to an aspect of the invention, the transmission control unit may transmit the wireless power signal to the wireless power receiving apparatus based on an ID signal of the wireless power receiving apparatus received through the near field communication module.

According to an aspect of the invention, the wireless power transmission control apparatus may further comprise: an object sensing unit configured to sense an external object; and an alarm module, wherein the transmission control unit is further configured to operate the alarm module of the wireless power transmission apparatus when the external object is sensed by the object sensing unit and the wake-up signal is not received.

According to an aspect of the invention, the wireless power transmission control apparatus may further comprise: a user input unit configured to input a start signal, wherein the transmission control unit is further configured to transmit the wireless power transmission signal to the wireless power receiving apparatus through the transmission coil while activating the deactivated power block, when the wake-up signal is not received through the communication unit and the start signal of the user input unit is inputted.

According to an aspect of the invention, the transmission control unit may be further configured to control the wireless power signal to have a frequency matching that of a resonance frequency of an impedance matching unit of the wireless power receiving apparatus, when a power transmission request signal is received through the communication unit.

According to an aspect of the invention, the wireless power transmission control method may further comprise: a near field communication module, wherein the transmission control unit receives the power transmission request signal through the near field communication module.

While not limited thereto, according to still another embodiment of the present invention, there is provided a wireless power receiving apparatus, comprising: a receiving coil configured to receive a wireless power transmission signal; an impedance matching unit configured to resonate between the receiving coil and a transmission coil of the warless power transmission apparatus; a communication module configured to transmit a wake-up signal to the wireless power transmission apparatus; a power block configured to receive a power signal from the impedance matching unit and to output a DC power; a power control block configured to control the power block; a battery configured to be charged with DC power from the power block; and a receiving control unit configured to control the communication module to transmit the wake-up signal to the wireless power transmission apparatus, and to control the power control block to charge the battery when a wireless power signal is received from the wireless power transmission apparatus.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
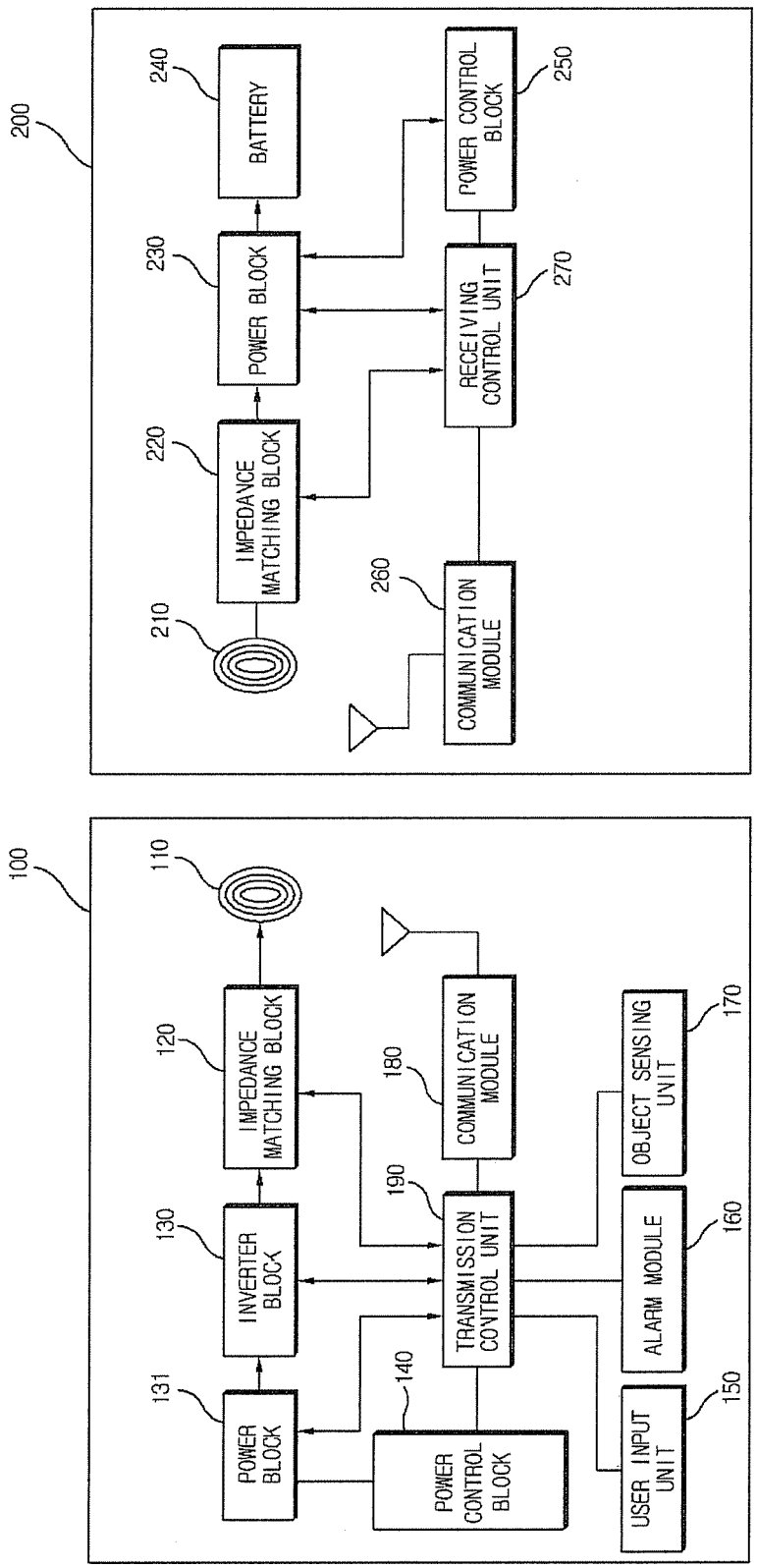
FIG. 1 is a block configuration diagram illustrating an electronic configuration of a wireless power transmission system, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

According to embodiments of the present invention, a wireless power transmission system uses a near field wireless power transmission method, which may be but is not limited to electromagnetic induction or magnetic resonance. Other possible methods will be recognized by those skilled in the art.

The wireless power transmission system may be a resonant wireless power transmission system.

FIG. 1 is a block configuration diagram illustrating an electronic configuration of a wireless power transmission system, according to an embodiment of the present invention. According to the embodiment illustrated in FIG. 1, a wireless power transmission system may comprise a wireless power transmission apparatus 100 and a wireless power receiving apparatus 200.

The wireless power transmission apparatus 100 is configured to transmit a wireless power signal to the wireless power receiving apparatus 200. The wireless power receiving apparatus 200 is configured to receive the wireless power signal from the wireless power transmission apparatus 100, and to rectify the received wireless power signal so as to be used as operating power or to charge a battery 240.

According to the embodiment illustrated in FIG. 1, the wireless power transmission apparatus 100 may comprise a transmission coil 110, an impedance matching block 120, an inverter block 130, a power block 131, a power control block 140, a user input unit 150, an alarm module 160, an object sensing unit 170, a communication module 180, and a transmission control unit 190.

The transmission coil 110 is configured to transmit a power signal to the receiving coil 210 of the power receiving apparatus. The transmission may be by a magnetic resonance method or an electromagnetic induction method, among other methods which will be appreciated by those skilled in the art. The transmission coil 110 may comprise one or more of any of track, oval, squared, or circular coils, among other configurations of coils, according to the transmission characteristics.

The impedance matching block 120 is configured to control the impedance of the transmission coil 110 so as to realize a resonance between the transmission coil 110 and a receiving coil 210 of the wireless power receiving apparatus 200. According to the embodiment illustrated in FIG. 1, the wireless power receiving apparatus 200 also comprises an impedance matching block 220, such that the resonance between the transmission coil 110 and the receiving coil 210 may be controlled more efficiently.

The inverter block 130 is configured to transmit a power signal to the transmission coil 110 through the impedance matching block 120. That is, the inverter block 130 switches a DC power supplied from the power block 131 configured to generate an AC power, and transmits the generated AC power to the transmission coil 110.

The power block 131 is configured to transfer power supplied from an external power, such as an adaptor (not illustrated) or the like, to the inverter block 130. According to various embodiments, the power block 131 may be controlled by the power control block 140 or by the transmission control unit 190, among other configurations.

According to the present invention, the user input unit 150 is configured to generate a start signal that comprises a command to activate the power block 131 and the inverter block 130. An operation according to the start signal will be described in more detail with reference to FIG. 3.

The alarm module 160 is configured to inform a user of situations in which an external object is sensed by the object sensing unit 170, described in detail below, but the wireless charging does not begin because the wake-up signal was not received from the wireless power receiving apparatus 200. When the alarm module 160 is operated and thus the user confirms that the wireless charging has not begun, the user may generate the start signal using input through the user input unit 150, such that the wireless charging may begin.

The object sensing unit 170 is configured to sense the presence of an external object, presumably the wireless power receiving apparatus 200. The object sensing unit 170 may comprise an infrared sensing sensor, an ultrasonic sensing sensor, or other similar sensors, the variety of which will be recognized by those skilled in the art.

The communication module 180 is configured to receive a wake-up signal from a communication module 260 of the wireless power receiving apparatus 200. The communication module 180 may use communication methods including but not limited to Bluetooth, ZigBee, RFID, infrared communication, WLAN, and the like.

The transmission control unit 190 is configured to activate the power block 131 and the inverter block 130 when either is deactivated, in response to the wake-up signal received by the communication module 180, and thus may control the transmission of the wireless power signal through the transmission coil 110. The wireless power signal transmission begins when an ID signal of the wireless power receiving apparatus 200 is received through the near field communication module 180. An operation of the transmission control unit 190 will be described in more detail with reference to FIGS. 2 and 3, further below.

Meanwhile, according to the embodiment illustrated in FIG. 1, the wireless power receiving apparatus 200 may comprise a receiving coil 210, an impedance matching block 220, a power block 230, a battery 240, a power control block 250, a communication module 260, and a receiving control unit 270.

The receiving coil 210 is configured to receive a wireless power signal from the wireless power transmission apparatus 100. The receiving coil 210 may comprise one or more of any of track, oval, squared, or circular coils, among other configurations of coils, according to the receiving characteristics.

The impedance matching block 220 is configured to control the impedance of the transmission coil 210 so as to realize a resonance between the transmission coil 110 and the receiving coil 210. As described above, according to the embodiment illustrated in FIG. 1, the wireless power transmission apparatus 100 also comprises an impedance matching block 120 to generate and control resonance even more efficiently.

The power block 230 comprises a rectifying unit that converts an AC power, received through the impedance matching block 220, into DC power which charges the battery 240. That is, the AC power generated by the wireless power signal received through the receiving coil 210 is changed to a constant voltage or a constant current by the power block 230, which in turn charges the battery 240. According to various embodiments, the power block 230 may be controlled by the power control block 250 or the receiving control unit 270, among other configurations.

The communication module 260 is configured to transmit the wake-up signal to the wireless power transmission apparatus 100 through the communication module 180 of the wireless power transmission apparatus 100. The wake-up signal activates the power block 131 and the inverter block 130 in the wireless power transmission apparatus 100 if either are deactivated.

The receiving control unit 280 is configured to control the communication module 260 of the wireless power receiving apparatus 200 to transmit the wake-up signal, and to control the impedance matching block 220, the power control block 250, and the power block 230 to charge the battery 240 with constant voltage or constant current.

According to the embodiment illustrated in FIG. 1, it is possible to prevent standby power consumption when the wireless power transmission is not in progress, by deactivating the power block 131 when the wireless power transmission is not in progress, and activating the power block 131 in response to the wake-up signal from the wireless power receiving apparatus 200.

A power transmission control method in the wireless power transmission system, according to an embodiment of the present invention, will be now described in more detail with reference to FIGS. 2 and 3.

Figure 2:
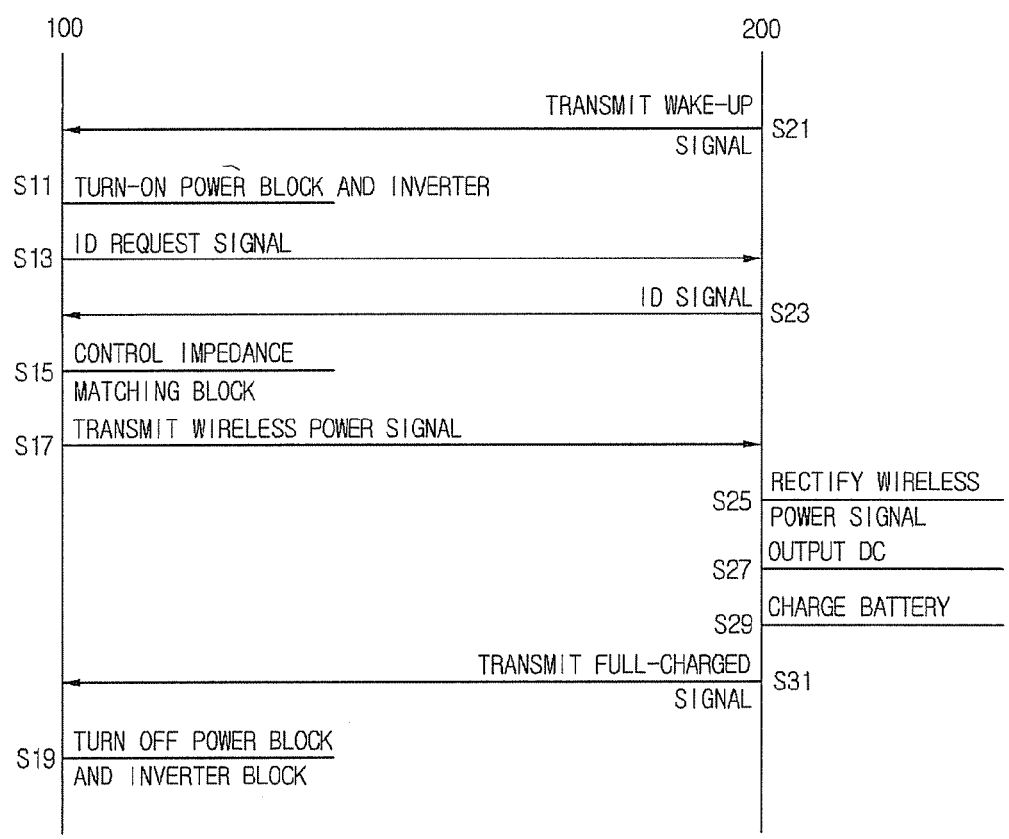
FIG. 2 is a flow chart describing a first example of a wireless power transmission control method in the wireless power transmission system, according to an embodiment of the present invention.

FIG. 2 is a flow chart describing a first example of a wireless power transmission control method in the wireless power transmission system, according to an embodiment of the present invention.

According to the embodiment illustrated in FIG. 2, first, when the wireless power receiving apparatus 200 approaches the wireless power transmission apparatus 100, the wake-up signal is transmitted to the wireless power transmission apparatus 100 (S21). The wake-up signal may be made by the near field communication module 180. When the wake-up signal is received, the power block 131 and the inverter block 130, previously deactivated, are activated (S11).

Next, the wireless power transmission signal is transmitted to the wireless power receiving apparatus 200 through the transmission coil 110 of the wireless power transmission apparatus 100. To elaborate, the wireless power transmission apparatus 100 transmits an ID request signal to the wireless power receiving apparatus 200 through the communication module 180, and the wireless power receiving apparatus 200 receiving the ID request signal transmits a power transmission request signal to the wireless power transmission apparatus 100 (S13, S23). Next, resonance between the receiving coil 210 and the transmission coil 110 is realized based on the power transmission request signal, using the impedance matching block 120 (S15). It will be appreciated that the resonance may also be realized or improved using the impedance matching block 220, by itself or in combination with the impedance matching block 120. The wireless power signal is then transmitted through the transmission coil 110 (S17).

The wireless power receiving apparatus 200 receives the wireless power signal through the receiving coil 210, rectifies the wireless power signal through the power block 230 (S25), and outputs the rectified wireless power signal as a DC power of constant voltage or constant current (S27), which then charges the battery 240 (S29). During the charging, a charging state information is transmitted to the wireless power transmission apparatus 100 through the near field communication module 260. Based on the charging state information, the wireless power transmission apparatus 100 controls the impedance matching block 120 or the inverter block 130 to transmit the wireless power transmission signal having an appropriate frequency and phase, thereby increasing charging efficiency.

When the charging of the battery 240 is completed, the wireless power receiving apparatus 200 transmits a full-charged signal through the near field communication module 260 (S31). The wireless power transmission apparatus 100, upon receiving the full-charged signal, again deactivates the power block 131 and the inverter block 130 (S19).

In the above example, as the battery 240 of the wireless power receiving apparatus 200 is not completely discharged as of operation (S21), a power transmission control method may comprise the transmission of a wake-up signal. When the battery 240 of the wireless power receiving apparatus 200 is completely discharged, the wireless power receiving apparatus 200 may be unable to transmit the wake-up signal due to lack of power. This case will be described in more detail with reference to FIG. 3.

Figure 3:
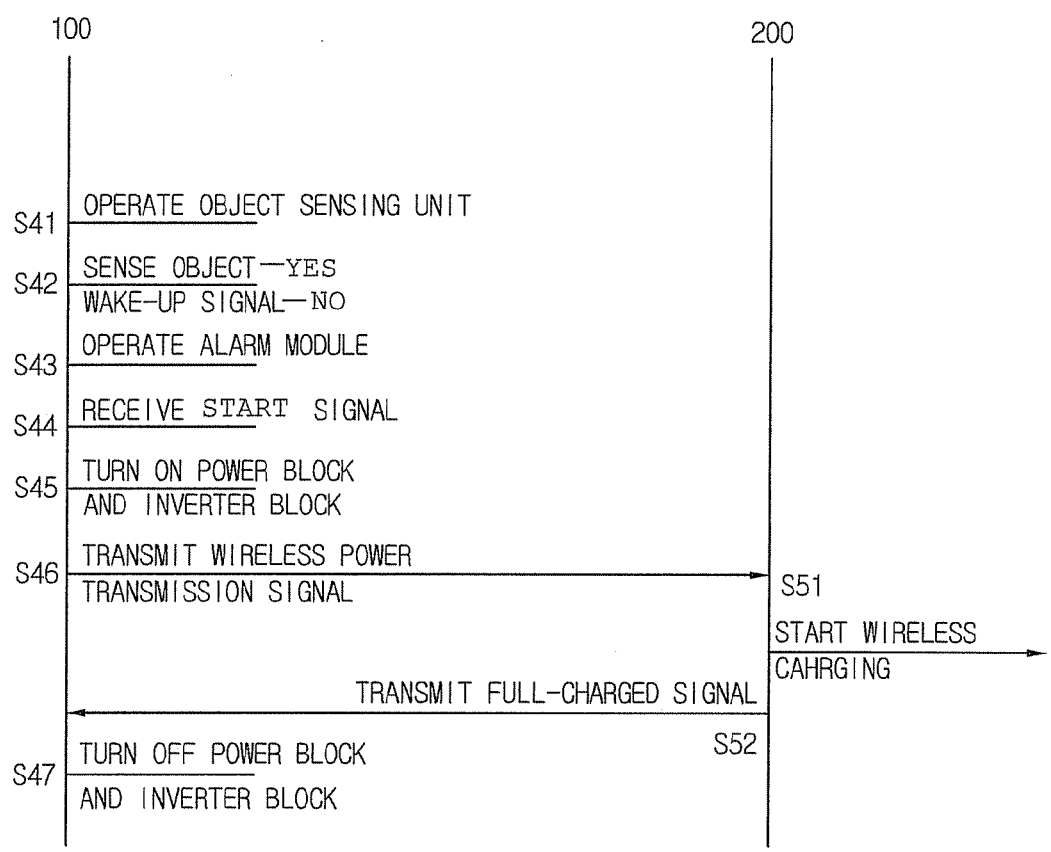
FIG. 3 is a flow chart describing a second example of the wireless power transmission control method in the wireless power transmission system, according to an embodiment of the present invention.

FIG. 3 is a flow chart describing a second example of the wireless power transmission control method in the wireless power transmission system, according to an embodiment of the present invention. According to the embodiment illustrated in FIG. 3, the wireless power receiving apparatus 200 operates the object sensing unit 170 to determine whether an external object is present at a charging position (S41). However, when an external object is sensed but the wake-up signal is not received from the wireless power receiving apparatus 200 (S42), the transmission control unit 190 operates the alarm module 160 (S43). The operation of the alarm module 160 alerts a user of the system that charging has not begun. In this case, the user generates a start signal using the user input unit 150 (S44). When the transmission control unit 190 receives the start signal, the transmission control unit 190 transmits the wireless power transmission signal (S46) while activating the power block 131 and the inverter block 130 (S45), such that the wireless charging begins in the wireless power transmission apparatus 100 as illustrated in FIG. 2 (S51). When the battery 240 is fully charged, the wireless power receiving apparatus transmits the full-charged signal to the transmission apparatus 100 (S52), and in response the wireless power transmission apparatus 100 again deactivates the power block 131 and the inverter block 130 (S47).

According to an embodiment of the present invention having the foregoing configuration, it is possible to prevent standby power consumption when the wireless power transmission is not in progress, by deactivating the power block when the wireless power transmission is not in progress and activating the power block in response to the wake-up signal from the wireless power receiving apparatus. It is therefore possible, in configurations in which the wireless power transmission apparatus ordinarily consumes a large amount of power, to increase the power efficiency of the overall system by reducing the standby power.

In addition, it is possible to start the wireless power transmission according to a user selection, even when the start signal is not transmitted due to lack of power in the wireless power receiving apparatus.

The wireless power transmission control method in the wireless power transmission system, the wireless power transmission apparatus using the same, and the wireless power receiving apparatus using the same are not limited to the configurations and methods of the foregoing embodiments, but all or a part of the embodiments may be selectively combined so as to be variously changed. It would also be appreciated by those skilled in the art that still other changes may be made in this embodiments without departing from the principles and spirit of the invention, the scope of which is defined in the claims and their equivalents.

What is claimed is:

1. A wireless power transmission control method in a wireless power transmission system, the method comprising:
    entering a power-off mode where both a power block and an inverter block of the wireless power transmission apparatus are turned off;
    receiving a wake-up signal from a wireless power receiving apparatus in the power-off mode;
    in response to the wake-up signal, activating a deactivated power block; and
    transmitting a wireless power transmission signal to the wireless power receiving apparatus through a transmission coil of a wireless power transmission apparatus while activating the deactivated power block, when the wake-up signal is received, to prevent standby power consumption.

2. The wireless power transmission control method of claim 1, wherein the wake-up signal is received through a near field communication module.

3. The wireless power transmission control method of claim 1, further comprising:
    receiving a power transmission request signal of the wireless power receiving apparatus,
    wherein the transmitting of the wireless power transmission signal is in response to the power transmission request signal.

4. The wireless power transmission control method of claim 3, wherein the power transmission request signal is received through a near field communication module.

5. The wireless power transmission control method of claim 3, wherein the power transmission request signal comprises information describing a resonance frequency, and the transmitting of the wireless power transmission signal comprises matching a frequency of the wireless power transmission signal to the resonance frequency.

6. The wireless power transmission control method of claim 1, further comprising:
    determining whether an external object is sensed using an object sensing unit of the wireless power transmission apparatus; and,
    when the external object is sensed and the wake-up signal is not received, operating an alarm module of the wireless power transmission apparatus.

7. The wireless power transmission control method of claim 1, further comprising:
    in response to a start signal inputted by a user input unit of the wireless power transmission apparatus, activating a deactivated power block.

8. The wireless power transmission control method of claim 1, further comprising:
    receiving a full-charge signal from the wireless power receiving apparatus;
    in response to the full-charge signal, ceasing transmission of a wireless power transmission signal and deactivating an activated power block.

9. The wireless power transmission control method of claim 1, further comprising, in response to the wake-up signal, activating a deactivated inverter block.

10. The wireless power transmission control method of claim 8, further comprising, in response to the full-charge signal, deactivating an activated inverter block.

11. A wireless power transmission apparatus, comprising:
    a transmission coil configured to transmit a wireless power signal to a wireless power receiving apparatus;
    a communication unit configured to receive a wake-up signal from the wireless power receiving apparatus in a power-off mode where both a power block and an inverter block of the wireless power transmission apparatus are turned off;
    a power block configured to supply power; and
    a transmission control unit configured to activate the power block when the wake-up signal is received through the communication unit, and to transmit the wireless power transmission signal to the wireless power receiving apparatus through the transmission coil while activating a deactivated power block, when the wake-up signal is received, to prevent standby power consumption.

12. The wireless power transmission control apparatus of claim 11, wherein the communication unit comprises a near field communication module.

13. The wireless power transmission control apparatus of claim 11, wherein the communication unit is further configured to receive a power transmission request signal from the wireless power receiving apparatus, and
wherein the transmission control unit transmits the wireless power signal to the wireless power receiving apparatus when the transmission request signal is received through the communication unit.

14. The wireless power transmission control apparatus of claim 13, wherein the power transmission request signal comprises information describing a resonance frequency, and
wherein the transmission control unit is further configured to control the wireless power signal to have a frequency matching the resonance frequency.

15. The wireless power transmission control apparatus of claim 11, further comprising:
an object sensing unit configured to sense an external object; and
an alarm module,
wherein the transmission control unit is further configured to operate the alarm module of the wireless power transmission apparatus when the external object is sensed by the object sensing unit and the wake-up signal is not received.

16. The wireless power transmission control apparatus of claim 11, further comprising a user input unit configured to input a start signal,
wherein the transmission control unit is further configured to activate the power block when the start signal of the user input unit is inputted.

17. The wireless power transmission control apparatus of claim 11, further comprising:
an inverter block configured to switch a DC power supplied by the power block to an AC power,
wherein the transmission control unit is further configured to activate the inverter block when the wake-up signal is received through the communication unit.

18. The wireless power transmission control apparatus of claim 11, wherein the communication unit is further configured to receive a full-charge signal from the wireless power receiving apparatus, and
wherein the transmission control unit is further configured to deactivate the power block when a full-charge signal is received through the communication unit.

19. The wireless power transmission control apparatus of claim 14, further comprising an impedance matching unit,
wherein the transmission control unit controls the frequency of the wireless power signal using the impedance matching unit.

20. A wireless power receiving apparatus, comprising:
a receiving coil configured to receive a wireless power transmission signal;
an impedance matching unit configured to resonate between the receiving coil and a transmission coil of a wireless power transmission apparatus;
a communication module configured to transmit a wake-up signal to the wireless power transmission apparatus in a power-off mode where both a power block and an inverter block of the wireless power transmission apparatus are turned off;
a power block configured to receive a power signal from the impedance matching unit and to output a DC power;
a power control block configured to control the power block;
a battery configured to be charged with the DC power from the power block; and
a receiving control unit configured to control the communication module to transmit the wake-up signal to the wireless power transmission apparatus, and to control the power control block to charge the battery when a wireless power signal is received from the wireless power transmission apparatus.

* * * * *